(12) United States Patent
Tsao

(10) Patent No.: US 7,804,500 B2
(45) Date of Patent: Sep. 28, 2010

(54) METHODS OF DISPLAYING VOLUMETRIC 3D IMAGES

(76) Inventor: Che-Chih Tsao, 16 Walnut St., Suite #43, Arlington, MA (US) 02476

( * ) Notice: Subject to any disclaimer, the term of this patent is extended or adjusted under 35 U.S.C. 154(b) by 675 days.

(21) Appl. No.: 11/188,409

(22) Filed: Jul. 25, 2005

(65) Prior Publication Data

US 2006/0017727 A1  Jan. 26, 2006

Related U.S. Application Data

(60) Provisional application No. 60/591,128, filed on Jul. 26, 2004.

(51) Int. Cl.
*G06T 15/00* (2006.01)
*G06T 17/00* (2006.01)

(52) U.S. Cl. ............ 345/427; 345/419; 345/424; 348/51; 382/154

(58) Field of Classification Search ........... 345/6, 345/13, 14, 16, 31, 32, 72, 84, 201, 339, 345/340, 342–345, 348, 355, 358, 419, 420, 345/424–430, 433, 435, 438, 439, 473, 976, 345/977, 589; 348/42, 51, 52; 359/212, 359/478, 629, 865; 395/119, 120, 125–129; 382/285, 286, 287, 154, 276
See application file for complete search history.

(56) References Cited

U.S. PATENT DOCUMENTS

| | | | |
|---|---|---|---|
| 4,303,394 A * | 12/1981 | Berke et al. ............ 434/40 |
| 4,348,186 A * | 9/1982 | Harvey et al. ............ 434/44 |
| 4,446,480 A * | 5/1984 | Breglia et al. ............ 348/115 |
| 4,858,149 A * | 8/1989 | Quarendon ............ 345/419 |
| 5,042,909 A * | 8/1991 | Garcia et al. ............ 359/478 |
| 5,162,787 A * | 11/1992 | Thompson et al. ........ 345/32 |
| 5,280,277 A | 1/1994 | Hornbeck ............ 345/108 |
| 5,754,147 A * | 5/1998 | Tsao et al. ............ 345/6 |
| 5,850,225 A * | 12/1998 | Cosman ............ 345/427 |
| 5,854,613 A * | 12/1998 | Soltan et al. ............ 345/32 |
| 5,954,414 A * | 9/1999 | Tsao ............ 353/7 |
| 6,100,862 A | 8/2000 | Sullivan ............ 345/6 |
| 6,229,542 B1 * | 5/2001 | Miller ............ 715/782 |
| 6,302,542 B1 * | 10/2001 | Tsao ............ 353/7 |
| 6,377,229 B1 | 4/2002 | Sullivan ............ 345/6 |
| 6,466,185 B2 | 10/2002 | Sullivan ............ 345/6 |
| 6,525,699 B1 * | 2/2003 | Suyama et al. ............ 345/6 |
| 6,577,330 B1 * | 6/2003 | Tsuda et al. ............ 715/782 |
| 6,597,358 B2 * | 7/2003 | Miller ............ 345/427 |
| 6,613,100 B2 * | 9/2003 | Miller ............ 715/526 |
| 6,753,847 B2 * | 6/2004 | Kurtenbach et al. ....... 345/156 |
| 6,765,566 B1 * | 7/2004 | Tsao ............ 345/419 |
| 6,806,849 B2 | 10/2004 | Sullivan ............ 345/6 |
| 6,914,600 B2 * | 7/2005 | Malzbender et al. ....... 345/424 |
| 6,943,754 B2 * | 9/2005 | Aughey et al. ............ 345/8 |

(Continued)

*Primary Examiner*—Amare Mengistu
*Assistant Examiner*—Aaron M Guertin

(57) ABSTRACT

This invention describes methods of displaying both physiological and psychological depth cues in a volumetric image display. This added psychological visual depth can display a background image of infinite depth. The basic concept is to combine a skewed coordinate system with a 2D image plane and display the V3D object as a V3D image according to the skewed 3D coordinates if the object falls in the physical 3D space, but display the object as a 2D perspective image if it falls beyond the 3D space into the 2D plane's virtual space.

10 Claims, 5 Drawing Sheets

U.S. PATENT DOCUMENTS

| | | | |
|---|---|---|---|
| 6,958,837 B2 * | 10/2005 | Hartwig | 359/201 |
| 6,961,045 B2 * | 11/2005 | Tsao | 345/103 |
| 2002/0084951 A1 * | 7/2002 | McCoy | 345/31 |
| 2002/0190922 A1 * | 12/2002 | Tsao | 345/32 |
| 2004/0135744 A1 | 7/2004 | Bimber et al. | |
| 2005/0280603 A1 * | 12/2005 | Aughey et al. | 345/8 |

* cited by examiner

METHODS OF DISPLAYING VOLUMETRIC 3D IMAGES

CROSS-REFERENCE TO RELATED APPLICATIONS AND OTHER DOCUMENTS

This application claims the benefit of prior U.S. provisional application No. 60/591,128 filed Jul. 26, 2004, the contents of which are incorporated herein by reference.

This invention relates to Tsao U.S. patent application Ser. No. 09/882,826, filed Jun. 16, 2001, which has been allowed. This invention also relates to the following co-pending U.S. provisional application by Tsao: No. 60/581,422, filed Jun. 21, 2004, No. 60/589,108 filed Jul. 19, 2004, and No. 60/589,626 filed Jul. 21, 2004.

This invention also relates to the following US patents: Tsao et al., U.S. Pat. No. 5,754,147, 1998; Tsao, U.S. Pat. No. 5,954,414, 1999; Tsao, U.S. Pat. No. 6,302,542 B1, 2001; and Tsao, U.S. Pat. No. 6,765,566 B1, 2004.

This invention also relates to Tsao Japanese patent application no. 2001-318189, filed Oct. 16, 2001, laid open on Sep. 18, 2002 under no. P2002-268136A.

The above mentioned patents and pending applications are therefore incorporated herein for this invention by reference.

STATEMENT REGARDING FEDERALLY SPONSORED R&D

Not Applicable

REFERENCE TO COMPACT DISK APPENDIX

Not Applicable

BACKGROUND OF THE INVENTION

A volumetric 3D display displays 3D images in a real 3D space. Each "voxel" in a volumetric image locates actually and physically at the spatial position where it is supposed to be, and light rays travel directly from that position toward omni-directions to form a real image in the eyes of viewers. As a result, a volumetric display possesses all major elements in both physiological and psychological depth cues and allows 360° walk-around viewing by multiple viewers without the need of special glasses.

For example, Tsao in Japanese patent application publication no. P2002-268136A describes a volumetric 3D (V3D) display that a "rotary reciprocating" mechanism drives a flat panel display to create volumetric 3D images directly, as illustrated in FIG. 1, in side view. The flat panel display is mounted on a support structure 520. Two pairs of rotary arms, 510a and 510c, drive the flat panel display and the support structure in a rotary motion such that the flat panel display rotates about an axis but with its surface always facing a fixed direction. As a result, the display panel sweeps a display space 12 as if in a reciprocating motion. The moving display panel distributes frames of 2D images in the display space and forms V3D images by after-mage effect.

Another category of V3D displays uses a moving screen and projecting 2D images on the screen. FIG. 2 illustrates such a system. It has three major portions: a rotary reciprocating screen unit 1511 (comprising a screen 11 mounted on rotary arms 1522); a high frame rate image projection system 15; and an optical interfacing mechanism 13 (comprising a single reflector 1321 mounted on rotary arms 1322). The screen 11 and the reflector 1321 are driven by two rotary reciprocating mechanisms, similar to the mechanism of FIG. 1, respectively. The reflector 1321, called interfacing reflector moves in synchronization with the screen but at a linear speed of ½ of the speed of the screen. The projection path is from the projector 15 to the interfacing reflector 1321, then to the folding reflector 1502 and then to the screen. This projection path length is kept constant as the screen and the interfacing reflector rotate. The high-frame-rate projector projects a set of 2D image frames onto the moving screen. Details and variations of the system are described in Tsao U.S. Pat. No. 6,765,566 B1 (See FIG. 20 of the referred patent) and Tsao U.S. Pat. No. 6,302,542 (See FIGS. 2a, 4b and 5b and the specification of the referred patent)

One issue of a V3D display is the limit of psychological visual depth. The display space has a finite size and therefore the physiological visual depth is limited. In contrast, a 2D display can display basically an infinite depth by psychological cues in the form of perspective view.

This invention is to describe methods of displaying both physiological and psychological depth cues in a volumetric image display. This added psychological visual depth can display a background image of infinite depth and is useful in applications such as flight simulation or in gaming.

BRIEF SUMMARY OF THE INVENTION

The basic concept is to combine a skewed coordinate system with a 2D image plane and display the V3D object (size and position) as a V3D image according to the skewed 3D coordinates if the object falls in the physical 3D space, but display the object as a 2D perspective image if it falls beyond the 3D space into the 2D plane's virtual space.

There are two preferred methods to display images in the 2D image plane. The first method is to display images on the 2D image plane as planar volumetric 3D images. A variation of the first method displays the 2D image by texture mapping of a 2D map. Another variation displays the 2D image by refined multiple image frames, including multiple frames by pulse-width modulation. The second method uses a separate projector.

DETAILED DESCRIPTION OF THIS INVENTION

One advantage of V3D display based on rotary reciprocating screen (projection or active screen) is that high quality 2D image can be projected on selected frames. Making use of this advantage plus a skewed coordinate system, additional psychological visual depth can be added to the existing physical depth of V3D displays to further enhance the 3D visual effect.

Figure 1:
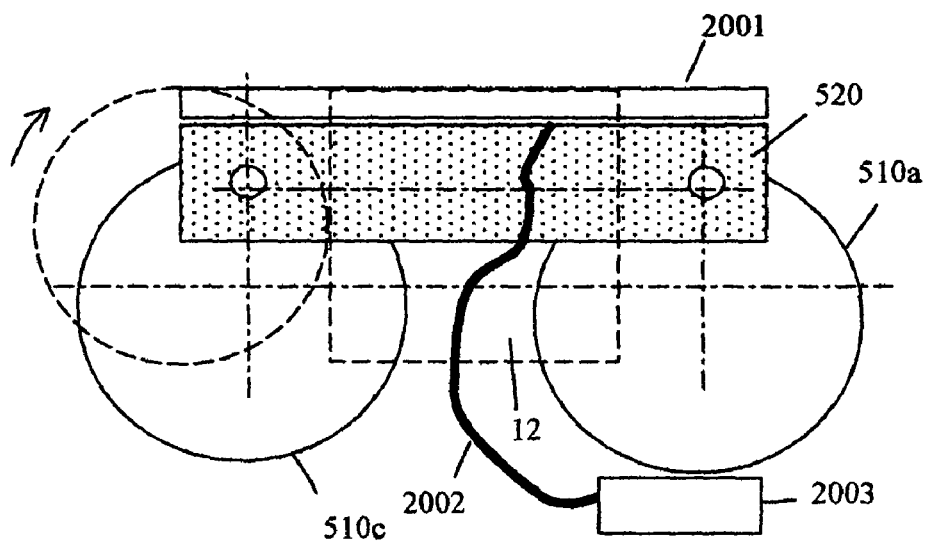
FIG. 1 illustrates a volumetric 3D display by moving display panel in the prior art.
Figure 2:
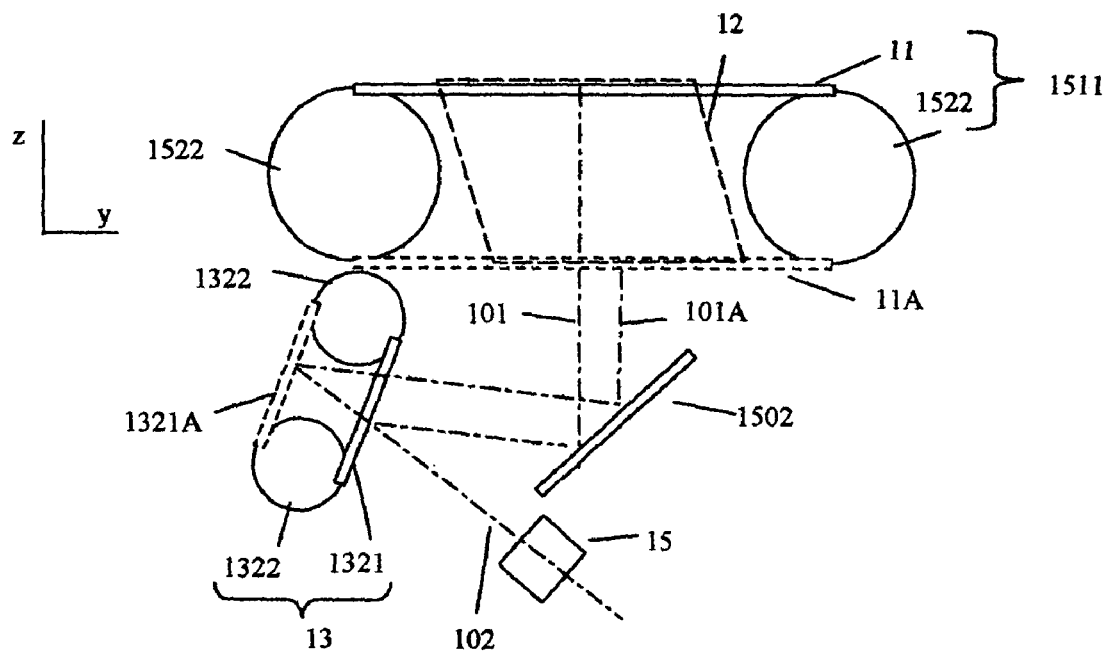
FIG. 2 illustrates a volumetric 3D display by moving screen projection in the prior art.
Figure 3:
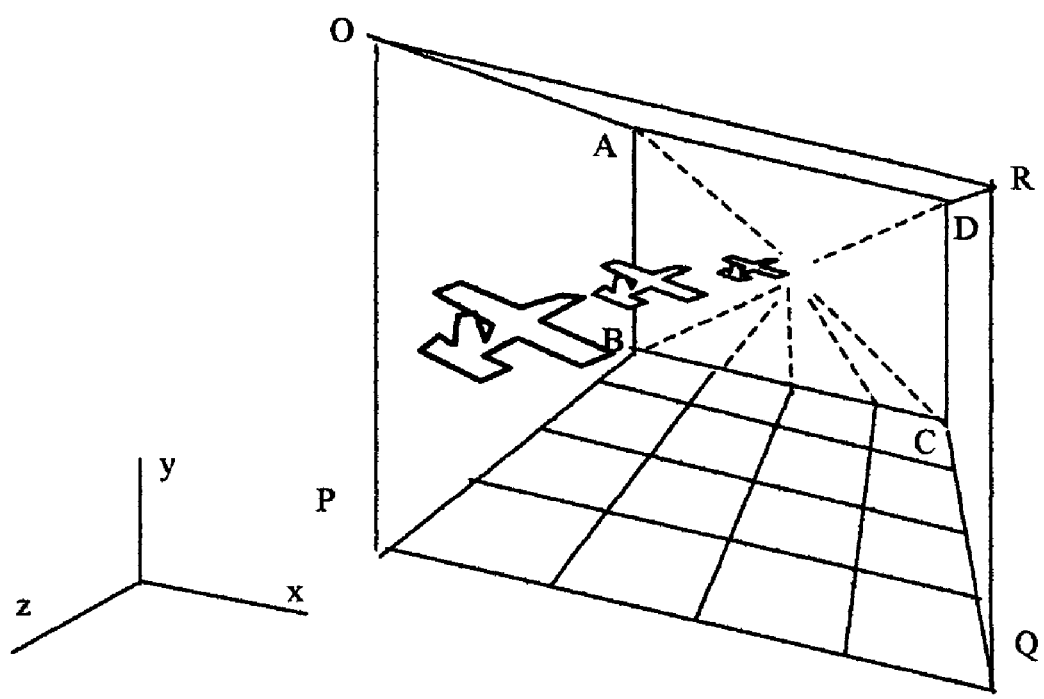
FIG. 3 illustrates the basic concept of this invention.

The basic concept is to combine a skewed coordinate system with a 2D image plane and display the V3D object (size and position) as a V3D image according to the skewed 3D coordinates if the object falls in the physical 3D space, but display the object as a 2D perspective image if it falls beyond the 3D space into the 2D plane's virtual space. FIG. 3 illustrates an example of such a coordinate system. The whole image of FIG. 3 is in the display volume (i.e. display space) of a volumetric 3D display. Space bounded by PQRO and ABCD is an orthogonal 3D space but with skewed dimensions. Line BC, which has the same length as line PQ, is presented shorter than PQ to amplify the distance, i.e. providing psychological depth cue. So plane ABCD actually has the same area as plane OPQR but is presented smaller. The space bounded by PQRO and ABCD is therefore a "Skewed Space". Plane ABCD is a 2D image plane. Object outside the Skewed Space and beyond plane ABCD is "inside" the 2D virtual space. The 2D virtual space has a virtual 3D coordinate system and objects in it should be displayed according to this virtual 3D coordinate system. The 2D plane can therefore display a background of infinite depth. The two coordinate systems, the virtual system and the skewed system, connect at plane ABCD. As a result, an object, such as the image of an airplane, can move between the two spaces, one virtual and one physical, smoothly. When the air plane is close to PQRO plane, it appears larger. When it moves away from PQRO plane toward plane ABCD, it not only moves farther but also becomes smaller in size due to the skewed coordinate system. Therefore it appears to move even farther into the space. When the airplane moves into the 2D image plane, it can continue into basically infinite depth. Naturally, the visual effect is most suitable for viewing from plane OPQR into ABCD.

Figure 4:
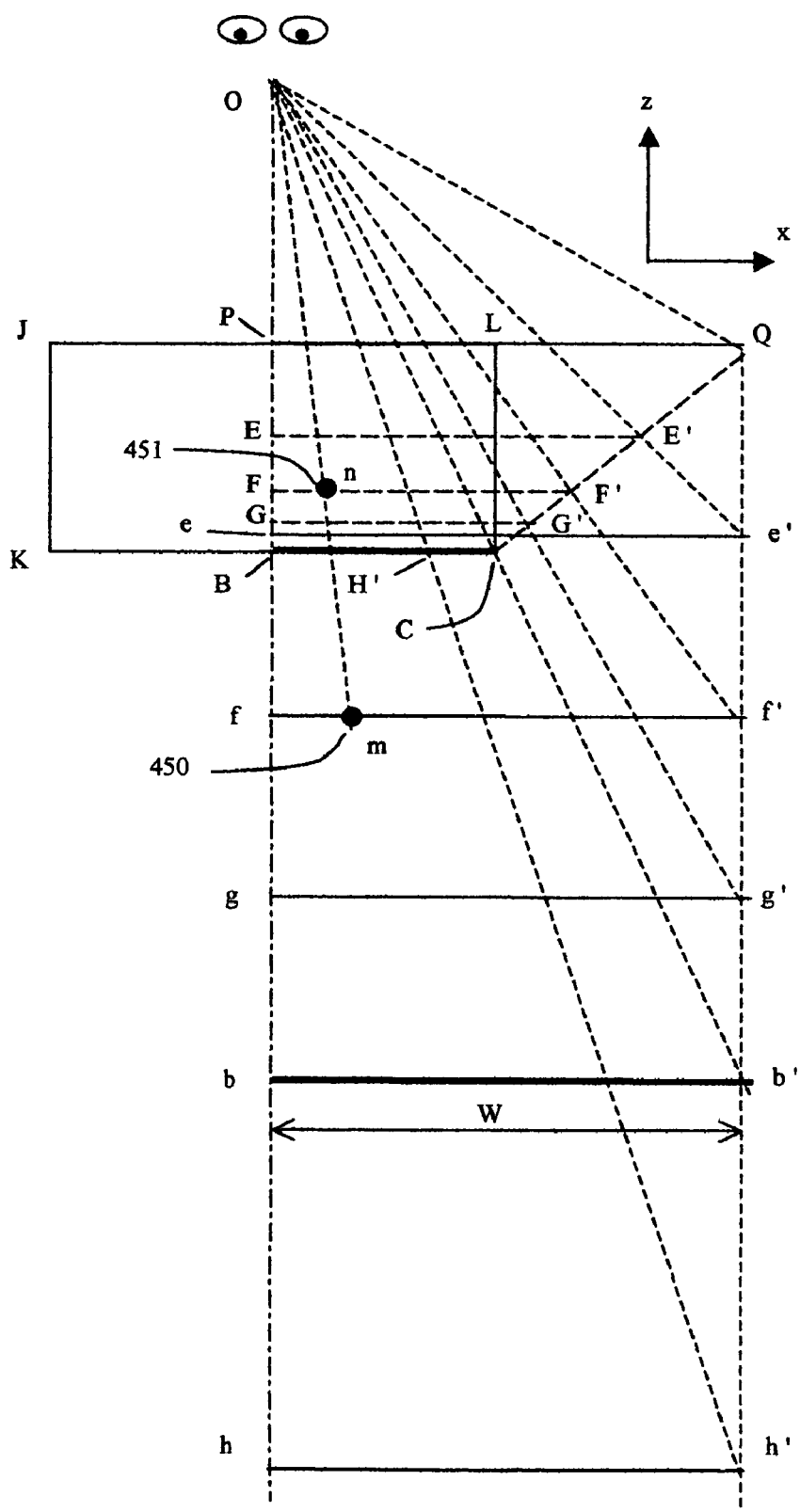
FIG. 4 and FIG. 7 illustrate geometric analysis of coordinate mapping of this invention.

FIG. 4 provides geometric analysis for the coordinate system mapping. Rectangle JKCL represents the display space of a V3D display. The 2D image plane for displaying the 2D virtual space is selected at the "bottom" of the display space, KC. A reference location O is set as the location of eyes, at a distance OB above the 2D image plane. The geometric analysis will be made on one side of the center line OB, since the graph is symmetric.

First, in the non-skewed coordinate system, set a reference plane bb' of size W at a distance Ob from eyes to just fit in the 2D image plane BC in the eye view. The relation between W and Ob is:

$$BC/W = OB/Ob \quad (101)$$

Assuming CQ is a straight line, then the mapping is to map the rectangular space P b b'Q into the skewed space PBCQ, and to map the space beyond bb' plane into the virtual space displayed on the 2D image plane BC.

For a plane (f f') of size W at a distance Of from eye location, Of<Ob, its corresponding location OF and size FF' in the skewed coordinate system can be found.

Per triangle O f f', $$OF/Of = FF'/W \quad (102)$$

Per triangle LCQ, $$BF/BP = (FF'-PL)/(PQ-PL)$$

$$(OB-OF)/BP = (FF'-PL)/(W-PL) \quad (103)$$

OF and FF' can be obtained as a function of Of and other known parameters from eqn. (102) and (103). This means that an image of size FF' at OF appears juts as big as image f f' at Of.

For a plane (h h') of size W at a distance Oh from eye location, Oh>Ob, its corresponding size BH' on BC can be found from triangle Ohh', $$BH'/W = OB/Oh \quad (104)$$

Any point on plane ff', 450, can be mapped to a location on plane FF ', 451, by proportion from the size ratio, e.g.

$$Fn/fm = FF'/W \quad (105).$$

The same principle applies to mapping points on plane h h' to plane BH'.

Accordingly, any point in the non-skewed space beyond (below) PQ plane can be mapped either into the skewed space PBCQ or into the 2D image plane on BC using eqn. (102)-(105). In summary, the mapping described above is based on trigonometry using the location of eves as the origin. The orthogonal coordinate system in space Pbb'Q is mapped into the skewed space PBCQ. The space beyond bb' plane is mapped into the virtual 3D coordinate in the 2D display plane BC.

There are basically two preferred methods to display images in the 2D image plane. The first method is to display images on the 2D image plane as planar volumetric 3D images. Tsao U.S. provisional patent application No. 60/589,626 "Data Rendering Method for Volumetric 3D Displays" describes methods of rendering geometric primitives such as line and triangular surface. It also describes a method of texture mapping. By the method of texture mapping, a 2D bitmap can be mapped on to the 2D image plane, which is basically two large triangular plane, and be displayed.

Figure 5:
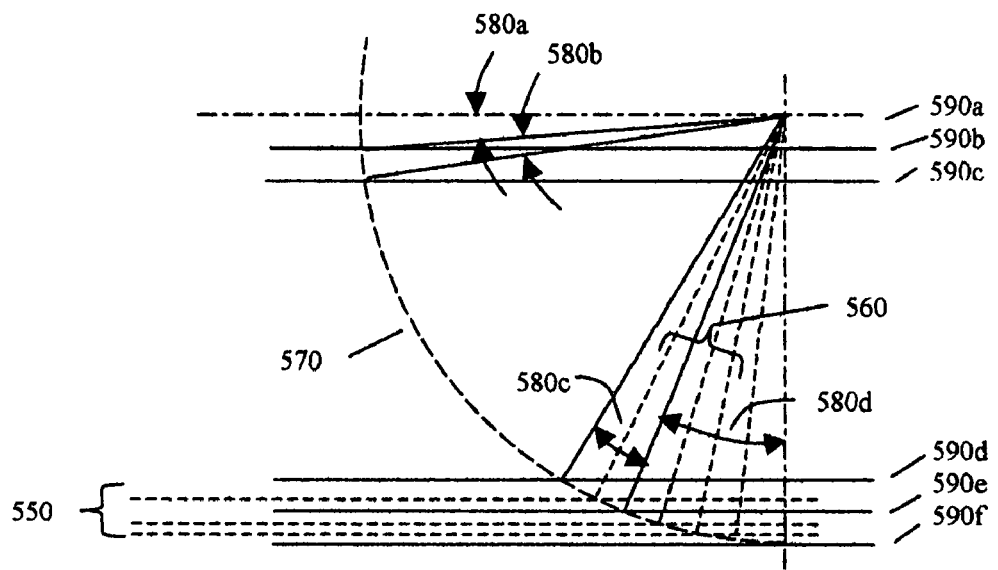
FIG. 5 illustrates refining image frames near bottom of a rotary reciprocating display.

For V3D display based on rotary reciprocating screen (or display panel), the frame position in the display space can be refined to put more frames into positions near the 2D image plane to further increase color or gray level on the 2D image plane. FIG. 5 illustrates the idea. Because the actual track of the moving screen 570 is circular and the frame pitch in the vertical direction is generally uniform, the angle traveled by the rotation from one frame to the next is always changing. When the screen is near bottom, the rotation angle between two adjacent frames, e.g. 580c & 580d, becomes significantly larger than the angular pitch when the screen is at middle positions, e.g. 580a & 580b. That is, the time between two adjacent frames is significantly longer when the screen is near bottom position (or top), because the screen rotates at constant speed. Therefore, more frames can actually be displayed at a finer vertical pitch, e.g. frames 550 in addition to frames 590d-590f. Because more image frames are used to generate the 2D image, more color or gray levels can be displayed. The 2D image plane is still displayed as a texture mapped plane in space, only the frame pitch is refined.

Alternatively, the number of frames and frame time periods near bottom can be refined and selected such that the time periods of different frames have a ratio. As a result, pixels on different frames will have different brightness, due to different frame time periods. When a 2D image is formed by superimposing a number of frames, this brightness difference helps to increase presentable brightness level further. For example, if three frames are used with the brightness ratio as 1:2:4, then each pixel in the superimposed 2D image will have 8 brightness level (0-7), instead of 3. This is similar to the method of pulse-width modulation, in Hornbeck U.S. Pat. No. 5,280,277, which is incorporated herein by reference.

Figure 6:
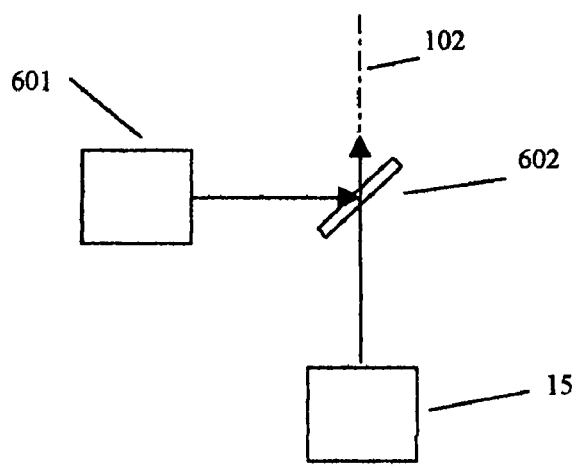
FIG. 6 illustrates a two-projector embodiment.

The second preferred method is to use a separate 2D projector, in addition to projector 15 to display the 2D images. FIG. 6 illustrates a preferred embodiment. The projection beam from the additional 2D projector 601 is brought to the projection path 102 via a switchable reflector 602. One example of switchable reflector is an electrically switchable mirror based on liquid crystal cells, which can be found in Buzak "A Field-sequential Discrete-depth-plane Three-dimensional Display," in SID International Symposium v. 16 p.

345 (1985), which is incorporated herein by reference. When the screen moves to the position of the 2D image plane, the switchable reflector is made reflective so that the 2D projector 601 projects 2D images. When the screen moves into the skewed space, the switchable reflector is made transmissive so that only the images from the original projector 15 enter the projection path 102.

The foregoing discussion should be understood as illustrative and should not be considered to be limiting in any sense.

Figure 7:
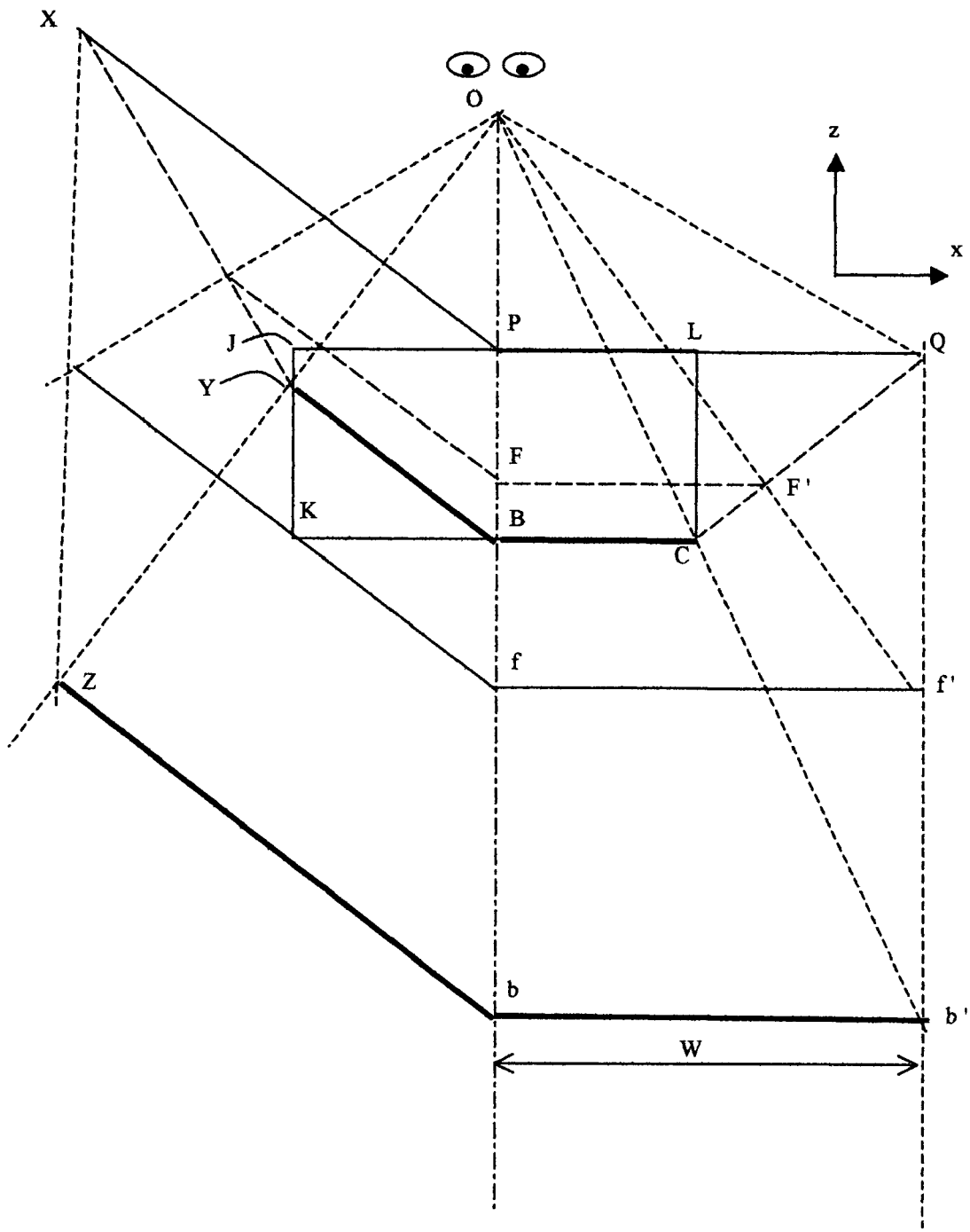

For example, this invention is not limited to V3D displays based on "rotary reciprocating mechanism". The general method of a skewed coordinate system integrated with a 2D virtual plane can be applied to all forms of V3D displays. For another example, the reference location of eyes does not have to be at the middle top of the display space. It can be offset away from the center line if necessary, and if the mapping is done accordingly. Further, the 2D image plane can be placed at any desired location, not just at the bottom of the display space. For example, FIG. 7 illustrates a 2D image plane YB defined off the bottom plane KC. The mapping is done by the same principle of FIG. 4. A reference plane Zb just fits into the 2D image plane YB. The non-skewed space XZbP maps to the skewed space XYBP. The space beyond plane Zb is mapped to 2D virtual space on YB. In addition, the right side of the center line is exactly the same as FIG. 4. We therefore see that two, or more, sets of skewed space and 2D image plane can be defined and integrated in a display space to cover a wide angle of view.

While this invention has been particularly shown and described with reference to certain embodiments thereof, it will be understood that these embodiments are shown by way of example only. Those skilled in the art will appreciate that various changes in form and details may be made therein without departing from the spirit and scope of the invention as defined by the following claims and their equivalents.

The invention claimed is:

1. Method of using a volumetric 3D display to display 3D data defined in a continuous space in order to display both physiological and psychological depth cues and a background image capable of infinite depth said volumetric 3D display being a type of display that displays 3D images in a display volume in real 3D space, the method including steps of:
   (1) defining a skewed space and a 2D image plane, said skewed space being a 3D space with a skewed coordinate system, said 2D image plane and at least part of said skewed space being inside said display volume, said skewed coordinate presenting an orthogonal 3D space with skewed dimensions such that unit length on one end of said skewed space appears longer than a unit length on the other end of said skewed s pace, thereby providing, additional psychological depth cues;
   (2) defining a virtual space with a 3D virtual coordinate system inside said 2D image plane, said 3D virtual coordinate system and said skewed coordinate system connecting at said 2D image plane, thereby extending psychological depth cues from said skewed space into said 2D image plane;
   (3) mapping the coordinate system of a part of said continuous space to said skewed coordinate system of said skewed space, naming this part of said continuous space as the first part of said continuous space;
   (4) mapping the coordinate system of the remaining part of said continuous space to said virtual 3D coordinate system of said virtual space in said 2D image plane;
   (5) displaying the part of said 3D data located within the first part of said continuous space in skewed space according to the mapping of coordinate systems between said first part of said continuous space and said skewed space;
   (6) displaying the part of said 3D data located within the remaining part of the continuous space as perspective images in said 2D image plane according to the mapping of coordinate systems between said remaining part of said continuous space and said virtual space.

2. Method of claim 1, wherein the step(3) including steps of:
   selecting an eye location in said continuous space, said eye location also corresponding to a location at a distance from said 2D image plane;
   defining a reference plane in said continuous space and determining a reference location of said reference plane, said reference plane appearing just fitting in said 2D image plane when viewed from said eye location said continuous space thereby being divided into two portions by a plane on which said reference plane resides, one portion being closer to said eye location while the other portion being farther from said eye location, said first part of said continuous space being defined within the portion that is closer to said eye location;
   the mapping of coordinate systems described in the step (3) and the step (4) of claim 1 being based on trigonometry using said eye location as the origin.

3. Method of claim 1, wherein the step (6) including a step of rendering said perspective image as a bitmap and a step of rendering said 2D image plane with said bitmap by texture mapping.

4. Method of claim 1, wherein said volumetric 3D display comprising a moving display surface that displays and distributes image frames that form volumetric 3D images, said 2D image plane being located near and parallel to one of said image frames.

5. Method of claim 4, wherein said moving display surface revolving about an axis and sweeping said display volume while always keeping the display surface facing a fixed direction, said 2D image plane being located near top or bottom of said display volume, the method further including a step of generating on said display surface an additional number of image frames to be superimposed to form said 2D image plane.

6. Method of claim 5, wherein the displayed time periods of said additional number of image frames having a predefined ratio, said additional number of image frames forming levels of gray scale or color on said 2D image plane by the principle of pulse-width modulation.

7. Method of claim 4, further including a step of generating images for said 2D image plane by a separate projector means.

8. Method of claim 7, further including a step of using a switchable reflector to guide the projection beam from said projector means to said display surface.

9. Method of claim 1, further including a step of defining at least one additional skewed space with a skewed coordinate system and at least one additional 2D image plane in said display volume and the steps of mapping to and displaying in the additional set of skewed space and 2D image plane, said additional set of skewed space and 2D image plane connecting to the original set of skewed space and 2D image plane to cover a wide angle of view.

10. Method of using a volumetric 3D display to display 3D data defined in a continuous space in order to display both physiological and psychological depth cues and a background image capable of infinite depth, said volumetric 3D display being a type of display that displays 3D images in a display volume in real 3D space, the method including:

combining a skewed coordinate system with a 2D image plane in said display volume, said skewed coordinate system presenting an orthogonal 3D space with skewed dimensions such that a unit length on one end of a physical 3D space appears longer than a unit length on the other end of said physical 3D space, thereby providing additional psychological depth cues, said 2D image plane displaying images according to a virtual 3D coordinate system, said virtual 3D coordinate system and said skewed coordinate system connecting at said 2D image plane, thereby extending psychological depth cues from said physical space into said 2D image plane;

displaying a volumetric 3D object as a volumetric 3D image according to said skewed coordinates if the object falls in said physical 3D space, but displaying the object as a 2D perspective image according to said virtual 3D coordinates on said 2D image plane if the object falls beyond said physical 3D space.

\* \* \* \* \*